US012537307B2

(12) United States Patent
Blennius et al.

(10) Patent No.: US 12,537,307 B2
(45) Date of Patent: Jan. 27, 2026

(54) ANTENNA ARRANGEMENT COMPRISING A LAUNCH PIN

(71) Applicant: SAAB AB, Linköping (SE)

(72) Inventors: Martin Blennius, Kullavik (SE); Daniel Nyberg, Mölndal (SE)

(73) Assignee: SAAB AB, Linköping (SE)

( * ) Notice: Subject to any disclaimer, the term of this patent is extended or adjusted under 35 U.S.C. 154(b) by 201 days.

(21) Appl. No.: 18/552,712

(22) PCT Filed: Apr. 13, 2022

(86) PCT No.: PCT/SE2022/050369

§ 371 (c)(1),
(2) Date: Sep. 27, 2023

(87) PCT Pub. No.: WO2022/220732

PCT Pub. Date: Oct. 20, 2022

(65) Prior Publication Data

US 2024/0170850 A1 May 23, 2024

(30) Foreign Application Priority Data

Apr. 13, 2021 (SE) .................................... 2100051-8

(51) Int. Cl.
*H01Q 21/00* (2006.01)
*H01Q 9/04* (2006.01)
*H01Q 21/08* (2006.01)

(52) U.S. Cl.
CPC ....... *H01Q 9/0457* (2013.01); *H01Q 21/0006* (2013.01); *H01Q 21/08* (2013.01)

(58) Field of Classification Search
CPC .. H01Q 9/0457; H01Q 21/0006; H01Q 21/08; H01Q 9/0421; H01Q 9/045;
(Continued)

(56) References Cited

U.S. PATENT DOCUMENTS 10,541,467 B1 1/2020 Brigham et al.
2013/0120210 A1* 5/2013 Zeiger .................... H01Q 9/045 343/841

(Continued)

FOREIGN PATENT DOCUMENTS

EP 3322036 A1 5/2018
WO 2016008607 A1 1/2016

OTHER PUBLICATIONS

International Search Report and Written Opinion mailed May 30, 2022 for International Application No. PCT/SE2022/050369, 13 pages.

(Continued)

*Primary Examiner* — David E Lotter
(74) *Attorney, Agent, or Firm* — Sage Patent Group

(57) ABSTRACT

The present disclosure relates to an antenna arrangement including a sheet of dielectric having a connecting surface, the connecting surface including at least one grounding pad and a through-hole and an antenna element structure. The antenna arrangement further includes a launch pin including a conductive element and a dielectric element, wherein the conductive element includes a first portion having a first diameter, the first portion extending to a second portion having a second diameter, the second diameter being greater than the first diameter.

12 Claims, 6 Drawing Sheets

(58) Field of Classification Search
CPC .......... H01Q 13/08; H01Q 13/10; H01Q 1/12; H01Q 21/061; H01R 24/66
See application file for complete search history.

(56) References Cited

U.S. PATENT DOCUMENTS

2017/0194699 A1 7/2017 Ouedraogo et al.
2019/0181562 A1 6/2019 Shaw et al.
2020/0028242 A1* 1/2020 Brigham .................. H01Q 1/48

OTHER PUBLICATIONS

Fairview Microwave; “Launch Pin”; https://www.fairviewmicrowave.com/hermetic-seal-solder-contact-0.015-pin-diameter-0-body-0.16-pin-fm1016-9-p.aspx; Jan. 1, 2020; 2 pages.
Office Action mailed Apr. 28, 2025 for United Arab Emirates Patent Application No. P6002580/2023, 9 pages.
Extended European Search Report mailed Jan. 30, 2025 for European Patent Application No. 22788547.2, 9 pages.

* cited by examiner

ANTENNA ARRANGEMENT COMPRISING A LAUNCH PIN

CROSS-REFERENCE TO RELATED APPLICATIONS

This application is a 35 U.S.C § 371 national stage application for International Application No. PCT/SE2022/050369, entitled "AN ANTENNA ARRANGEMENT COMPRISING A LAUNCH PIN", filed on Apr. 13, 2022, which claims priority to Swedish Patent Application No. 2100051-8, filed on Apr. 13, 2021, the disclosures and contents of which are hereby incorporated by reference in their entireties.

TECHNICAL FIELD

The present disclosure relates to an antenna arrangement comprising a sheet of dielectric and at least one antenna launch pin.

BACKGROUND ART

Antennas are known in the art and used to convert radio frequency fields into alternating current or converting alternating current in to radio frequency. Antenna arrays with a set of two or more antenna elements are commonly used in various applications to combine or process signals from the antenna array in order to achieve improved performance over that of a single antenna element. For instance they are able to match a radiation pattern to a desired coverage area, changing radiation pattern, adapting to changing signal conditions and some configurations can cover a large bandwidth. Antenna arrays can be described by their radiation patterns and by the type of antenna elements in the system.

A conventional antenna arrangement comprises antenna elements on an antenna plate mounted to a circuit board. In such an arrangement, particularly in such an arrangement having active electronically scanned array (AESA), slot, notch or patch antennas operating at a high frequency, the reachable frequency is limited by the available space on the circuit board. A component which usually requires relatively large area on the circuit board, specifically within higher frequencies, are the launch pins. The launch pins provide the function of feeding the antenna elements with electromagnetic waves.

Conventional launch pins utilized in the present art are space inefficient and further contain an excessive amount of components which result in a launch pin being more expensive and difficult to manufacture. For an antenna arrangement having potentially thousands of antenna elements, an improvement in size and cost of an individual launch pin can reduce costs and improve space efficiency on an antenna arrangement to a great extent. The launch pin for an antenna arrangement is further set to fulfil certain performance requirements such as having a high electrical conductivity and being able to provide a microwave beam. Further, the launch pin should preferably have a low tolerance sensibility and be able to withstand environmental loads.

There is room for antenna arrangements to explore the domain of providing antenna arrangements having launch pins with improved space efficiency, assembly, and an improved manufacturing convenience while fulfilling requirements relating to performance. There is specifically a lack in the present art of how to improve an antenna arrangements having launch pins in order to obtain space efficiency on the circuit board of the arrangements while providing a simplified manufacturing, assembly and maintaining requirements. Accordingly, there is room for improvements in the art to provide means for such an antenna arrangement. Essentially, it's of importance that not only the launch pin fulfils certain requirements e.g. the elements of the antenna arrangement should preferably be adapted and optimized so to facilitate for a convenient assembly and functioning if the antenna arrangement as a whole.

Even though some currently known solutions work well in some situations it would be desirable to provide an antenna arrangement having a launch pin that fulfils requirements related to improving the manufacturing, assembly and space efficiency of an antenna arrangement.

SUMMARY

It is therefore an object of the present disclosure to provide an antenna arrangement, a launch pin and a method for manufacturing an antenna arrangement to mitigate, alleviate or eliminate one or more of the above-identified deficiencies and disadvantages.

This object is achieved by means of a method for manufacturing an antenna arrangement, an antenna arrangement and a launch pin as defined in the appended claims.

The present disclosure provides an antenna arrangement comprising a sheet of dielectric having a connecting surface, the connecting surface comprising at least one grounding pad and a through-hole via and an antenna element structure. The antenna element structure comprises at least one radiating section and at least one receiving section extending towards the radiating section. The antenna arrangement further comprises at least one antenna launch pin comprising a conductive element and a dielectric element, wherein the conductive element comprises a first portion having a first diameter, the first portion extending to a second portion having a second diameter, the second diameter being greater than the first diameter, wherein the dielectric element sleeves an upper part of the first portion of the conductive element, and wherein a lower part of the conductive element protrudes from an end portion of the dielectric element. Moreover, the lower part of the conductive element is arranged so to extend through the through-hole via, allowing the launch pin to extend perpendicularly from said sheet of dielectric, wherein the antenna element structure is attached to the sheet of dielectric such that the launch pin extends into the radiating section through the receiving section. The conductive element is formed in one piece. Further the dielectric element is also formed in one piece.

A benefit of the antenna arrangement according to the present disclosure is that the launch pin increases the available space on the sheet of dielectric. Further, the present disclosure provides a launch pin with a second portion having a greater diameter than the first portion allowing the launch pin to have a small footprint while it is applicable to high frequency applications by having a greater diameter in said second portion.

Furthermore, the antenna arrangement according to the present disclosure is convenient and cost-efficient in assembly and manufacturing. Particularly, the launch pin comprising a dielectric element sleeving a conductive element facilitates the assembly and manufacturing.

The antenna element structure may comprise a first surface facing the sheet of dielectric, the first surface comprising a protruding rim associated with the receiving section wherein said protruding rim is in electrical contact with said grounding pad.

The protruding rim allows for the grounding pad to obtain electrical contact with the antenna element structure in a convenient manner. It should be noted that the term grounding pad refers to any structure that may lead to electrical contact. Thus the term grounding pad may refer to a socket structure or a spring like structure or any disc structure.

The lower part of the launch pin may be attached to the sheet of dielectric by means of soldering from a back surface of the sheet of dielectric, the back surface being on an opposite side of the sheet of dielectric relative to the connecting surface.

A benefit of this is that it allows for an efficient attachment of the launch pin to the sheet of dielectric from a back surface. Accordingly, this provides for flexibility in the manufacturing process since the launch pin may be soldered prior to when the antenna element structure is attached to the sheet of dielectric or also after the antenna element structure is attached to the sheet of dielectric.

The dielectric element may comprise a third diameter, wherein the third diameter may be 2-3 times greater than the first diameter, so to obtain a 50 ohm impedance.

A benefit of this relationship between the first and the third diameter is that it allows for a small enough diameter to save space on and around the sheet of dielectric but large enough to obtain a 50 ohm impedance so to prohibit a short circuit.

The antenna elements may be slot antenna elements, notch antenna elements or patch antenna elements.

The lower part of the conductive element may forms an interference relative the through-hole via, so to allow press-fit mounting of the launch pin into the through-hole via. Accordingly, the lower part of the conductive element may have a diameter being equal to or 0.001-10% smaller than the through-hole via so allow for press-fit mounting.

The receiving section may be a conical receiving section extending towards the radiating section in a tapering manner.

A benefit of having a conical receiving section is that it allows for the launch pin to be conveniently mounted to the antenna element structure. The conical receiving section may provide guidance for the launch pin to the receiving section, allowing for a rational production process e.g. handling deviating tolerances in manufacturing and assembly.

The dielectric element may be circumferentially secured/enclosed to at least a part of the receiving section. Providing the benefit of allowing the dielectric element to be secured within the conical receiving section so to hold the launch pin attached.

The conductive element may be a metal launch pin, or any other electric conductive material.

The dielectric element may be a polymer material.

The launch pin may be manufactured by means of additive manufacturing.

The present disclosure further provides a launch pin for an antenna structure comprising a conductive element and a dielectric element, wherein the conductive element comprises a first portion having a first diameter, extending to a second portion having a second diameter, the second diameter being greater than the first diameter. The dielectric element may comprise a hollow cylindrical form having a third diameter, wherein the third diameter is equal to or smaller than the second diameter. The dielectric element and the conductive element may have suitable forms other than cylindrical e.g. elliptical. The dielectric element sleeves at least an upper part of the first portion of the conductive element, wherein a lower part of the conductive element protrudes from an end of the dielectric element, wherein the lower part of the conductive element is arranged to be received by a through-hole via in a sheet of dielectric by means of press-fit. The launch pin provides the benefits as described previously in the disclosure herein. The dielectric element comprises a third diameter, wherein the third diameter may be 2-3 times greater than the first diameter, so to obtain a 50 ohm impedance.

There is also provided a method for manufacturing an antenna arrangement comprising the steps of: Providing a sheet of dielectric having a connecting surface, the connecting surface comprising at least one grounding pad and a through-hole via extending from the at least one grounding pad into the connecting surface. Further, the method comprises the step of providing an antenna element structure, the antenna element structure comprising at least one radiating section and at least one conical receiving section extending to the radiating section in a tapering manner. Further, the method comprises the step of providing a conductive element and a dielectric element, wherein the conductive element comprises a first portion having a first diameter, the first portion extending towards a second portion having a second diameter, the second diameter being greater than the first diameter.

Moreover, the method comprises the steps of: Forming a launch pin by sleeving the dielectric element onto the conductive element, wherein a lower part of the conductive element protrudes from an end portion of the dielectric element. Further, the method comprise the steps of press-fit mounting the lower part of the conductive element into the through-hole via and mounting the antenna element structure to the sheet of dielectric so that the launch pin extend into the radiating section through the conical receiving section.

A benefit of the method according to the present disclosure is that it allows for an antenna arrangement to be manufactured in a convenient and cost efficient manner.

BRIEF DESCRIPTION OF THE DRAWINGS

In the following the disclosure will be described in a non-limiting way and in more detail with reference to exemplary embodiments and tests illustrated in the enclosed drawings, in which.

DETAILED DESCRIPTION

In the following detailed description, some embodiments of the present disclosure will be described. However, it is to be understood that features of the different embodiments are exchangeable between the embodiments and may be combined in different ways, unless anything else is specifically indicated. Even though in the following description, numerous specific details are set forth to provide a more thorough understanding of the provided antenna arrangement and launch pin, it will be apparent to one skilled in the art that the system may be realized without these details. In other instances, well known constructions or functions are not described in detail, so as not to obscure the present disclosure.

Figure 1:
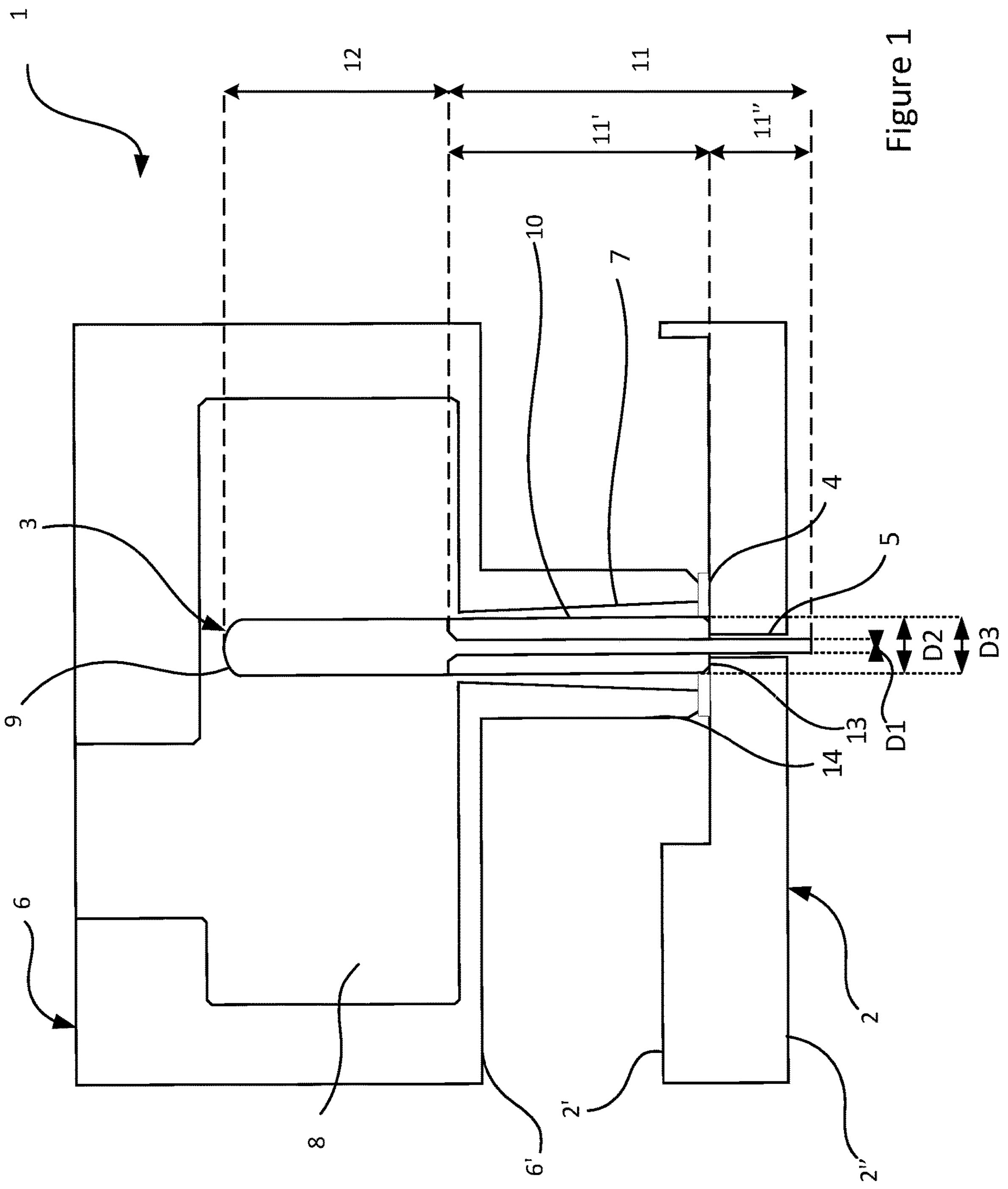
FIG. 1 illustrates a cut-out cross-sectional side-view of the antenna arrangement in accordance with an embodiment of the present disclosure.

FIG. 1 illustrates a cut-out cross-sectional side view of an antenna arrangement 1. The antenna arrangement 1 comprises a sheet of dielectric 2 having a connecting surface 2', the connecting surface 2' comprising at least one grounding pad 4 and a through-hole via 5. Further as seen in FIG. 1, the antenna arrangement 1 comprises an antenna element structure 6, the antenna element structure 6 comprising at least one radiating section 8 and at least one receiving section 7 extending towards the radiating section 8. The antenna arrangement 1 further comprises at least one antenna launch pin 3 comprising a conductive element 9 and a dielectric element 10 wherein the conductive element 9 comprises a first portion 11 having a first diameter D1, the first portion 11 extending to a second portion 12 having a second diameter D2, the second diameter D2 being greater than the first diameter D1.

Moreover, the dielectric element 10 sleeves an upper part 11' of the first portion 11 of the conductive element 9, and wherein a lower part 11" of the conductive element 9 protrudes from an end portion 13 of the dielectric element 10. As shown in FIG. 1, the lower part 11" of the conductive element 9 is arranged so to extend through the through-hole via 5, allowing the launch pin 3 to extend perpendicularly from said sheet of dielectric 2, wherein the antenna element structure 6 is attached to the sheet of dielectric 2, wherein the launch pin 3 extends into the radiating section 8 through the receiving section 7.

The antenna arrangement 1 as shown in FIG. 1 provides a low-cost, space efficient, robust antenna arrangement. The launch pin 3 allows for high frequency operation of the antenna arrangement 1 while simultaneously being compact in size and have a small footprint and assembly. Furthermore, the dielectric element 10 allows the launch pin 3 to impedance match while also functioning as a support structure for the conductive element 9, leading to a more robust structure resistant to vibrations and other disturbances. In other words, the dielectric element 10 may be circumferentially secured/enclosed to at least a part of the receiving section 7.

As further shown in FIG. 1, the antenna element structure 6 comprises a first surface 6' facing the sheet of dielectric 2, the first surface 6' may comprise a protruding rim 14 associated with the receiving section 7 wherein said protruding rim 14 is in electrical contact with said grounding pad 4. Further, the protruding rim 14 circumferentially encloses the grounding pad 4. The protruding rim 14 allows for easier assembly of the antenna arrangement 1. The protruding rim 14 may have a length being less than the upper part 11' of the conductive element 9, allowing for the second portion 12 of the launch pin 3 to be fully situated in the radiating section 8, as illustrated in FIG. 1.

As further shown in FIG. 1, the dielectric element 10 may comprise a third diameter D3, wherein the third diameter is 2-3 times greater than the first diameter D1, so to obtain a 50 ohm impedance. Preferably, the third diameter D3 is equal to the first diameter D1.

The lower part 11" of the conductive element 9 may form an interference relative the through-hole via 5, so to allow press-fit mounting of the launch pin 3 into the through-hole via 5. Accordingly, the diameter of the lower part 11" may preferably be equal to the diameter of the through hole via 5. Further, the lower part 11" may be tapered so to facilitate insertion into the through-hole via.

Figure 2:
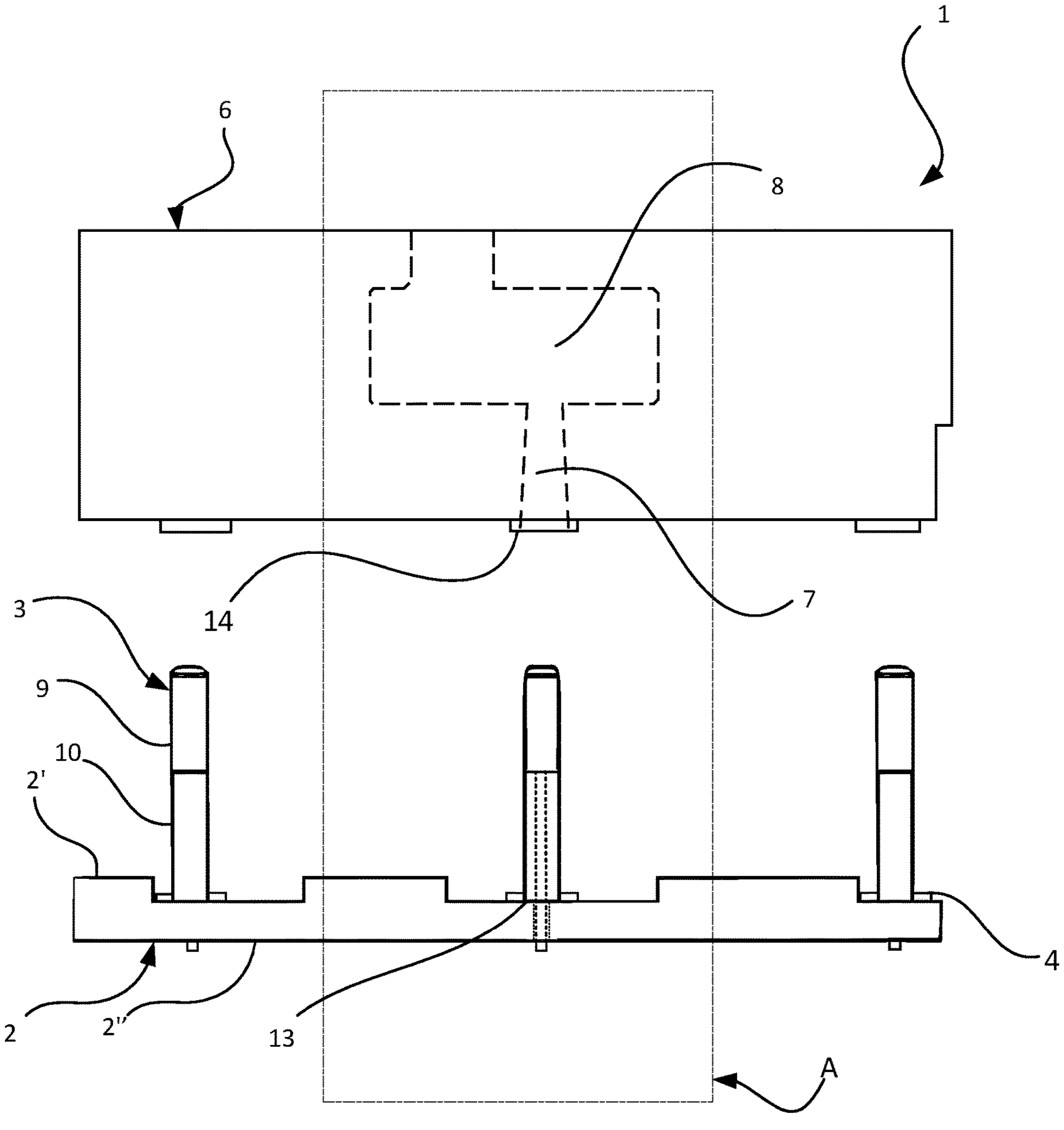
FIG. 2 illustrates an antenna arrangement from a side-view having a section A, illustrating an inner structure of the antenna arrangement in accordance with an embodiment of the present disclosure, wherein the antenna element structure and the sheet of dielectric are exploded.

FIG. 2 illustrates an exploded antenna arrangement 1 from a side-view. There are seen three launch pins 3 in FIG. 2 extending towards the radiating sections 8. FIG. 2 illustrates a section denoted 'A' showing inner portions of the antenna arrangement 1.

The lower part 11" of the launch pin 3 may attached to the sheet of dielectric 2 by means of soldering from a back surface 2" of the sheet of dielectric 2, the back surface 2" being on an opposite side of the sheet of dielectric 2 relative to the connecting surface 2'. As shown in FIG. 2, the launch pin 3 may protrude from said back surface 2".

FIGS. 1 and 2 illustrate that the antenna element structure 6 is a slot antenna element structure, however the antenna elements structure 6 may be a notch antenna element structure, a patch antenna element structure or any other suitable antenna element structure.

As further illustrated in FIGS. 1 and 2, the receiving section 7 may be a conical receiving section 7 extending towards the radiating section 8 in a tapering manner. Thus, allowing for an easier assembly of the antenna arrangement 1. Further, the conical receiving section 7 may be adapted to secure the dielectric element 10, wherein a portion of the conical receiving section comprise a diameter equal to, or smaller than the dielectric element 10, so to prohibit movement of the launch pin 3.

Figure 3:
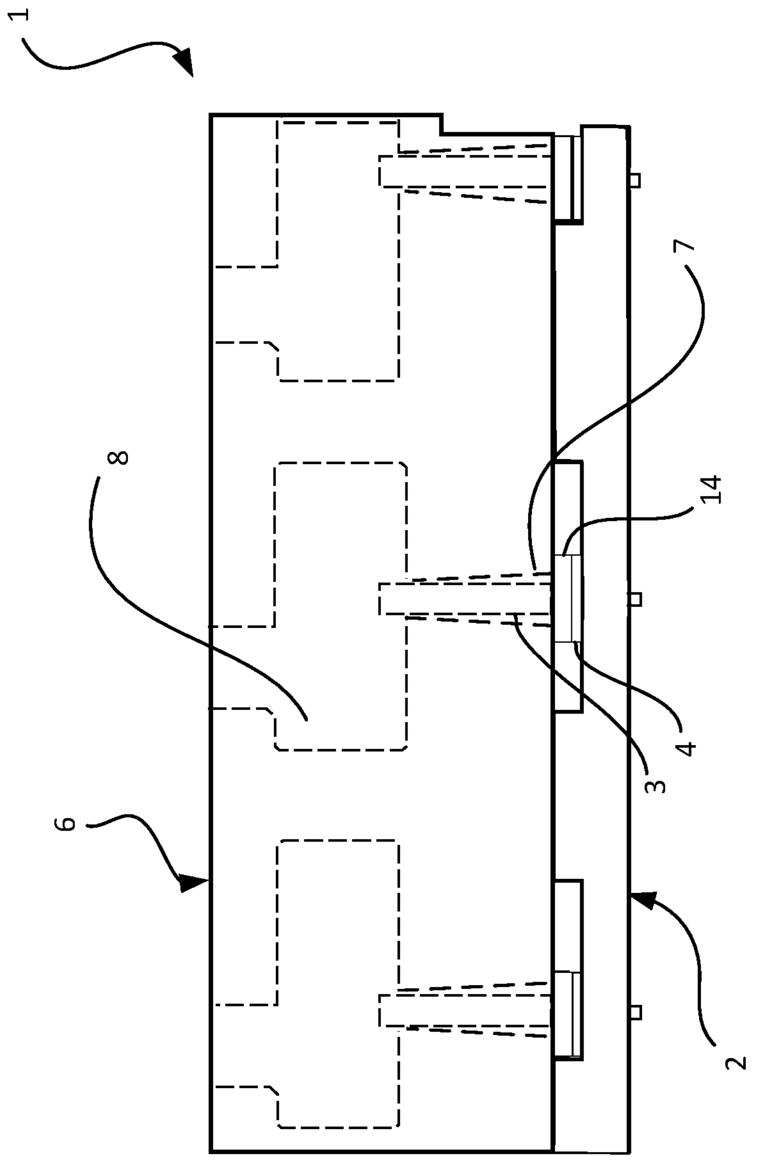
FIG. 3 illustrates a mounted antenna arrangement from a side-view.

FIG. 3 illustrates the antenna arrangement 1 when assembled from a side view. As shown in FIG. 3, the launch pins 3 extend in the radiating section 8. Further, FIG. 3 illustrates that the grounding pad 4, is in contact with the protruding rim 14.

Figure 4A:
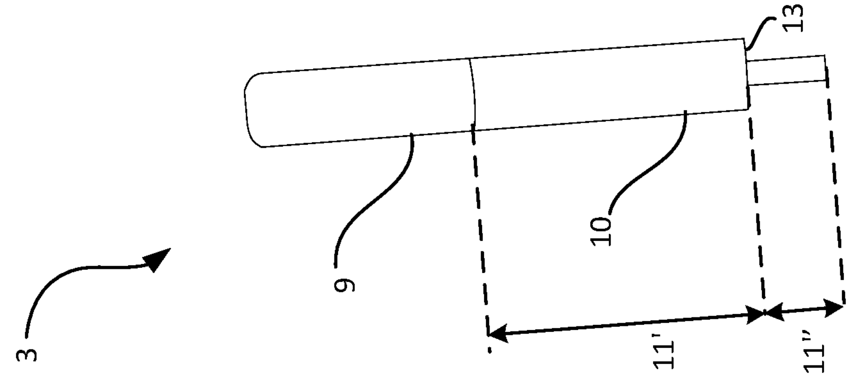
FIG. 4A illustrates an objective view of a launch pin in accordance with an embodiment of the present disclosure.

FIG. 4A illustrates a launch pin 3 from an objective view in accordance with the present disclosure. Further, FIG. 4B illustrates the launch pin 3 shown in FIG. 4A from an objective exploded view.

Figure 4B:
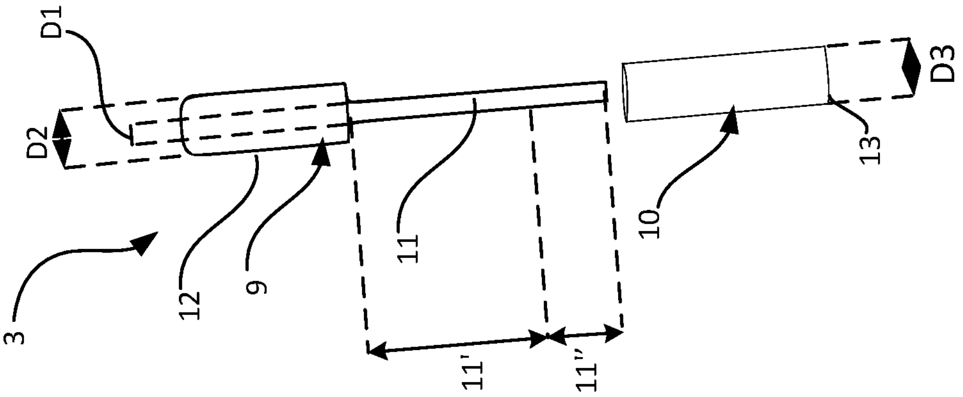
FIG. 4B illustrates an objective exploded view of a launch pin in accordance with an embodiment of the present disclosure.

FIG. 4A-4B illustrates a launch pin 3 for an antenna structure 1 comprising a conductive element 9 and a dielectric element 10.

The conductive element 9 comprises a first portion 11 having a first diameter D1, extending to a second portion 9 having a second diameter D2, the second diameter D2 being greater than the first diameter D1. Further, the dielectric element 10 comprises a hollow form having a third diameter D3, wherein the third diameter D3 is equal to or smaller than the second diameter D2. In FIGS. 4A and 4B, the dielectric element 10 comprises a cylindrical form, however it's not limited to such a form and may have any suitable form.

FIG. 4B illustrates that the dielectric element 10 sleeves at least an upper part 11' of the first portion 11 of the conductive element 9, wherein a lower part 11" of the conductive element 9 protrudes from an end 13 of the dielectric element 10, wherein the lower part 11" of the conductive element 9 is arranged to be received by a through-hole via in a sheet of dielectric (shown in FIGS. 1-2).

Figure 5:
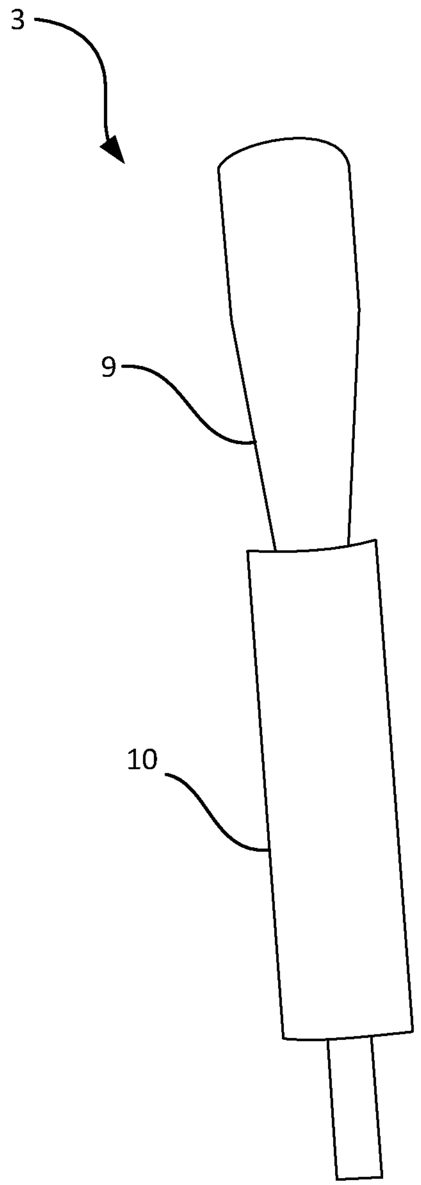
FIG. 5 illustrates an objective view of a launch pin in accordance with an embodiment of the present disclosure.

FIG. 4B further illustrates that the dielectric element 9 third diameter D3 is 2-3 times greater than the first diameter D1, this allows the launch pin 3 to obtain a 50 ohm impedance. FIG. 5 illustrates a launch pin 3 in accordance with some embodiments, as seen in FIG. 5, the conductive element 9 comprises a tapering form. In other words, the launch pin 3 is not limited to the form as shown in FIGS. 1-4B.

Figure 6:
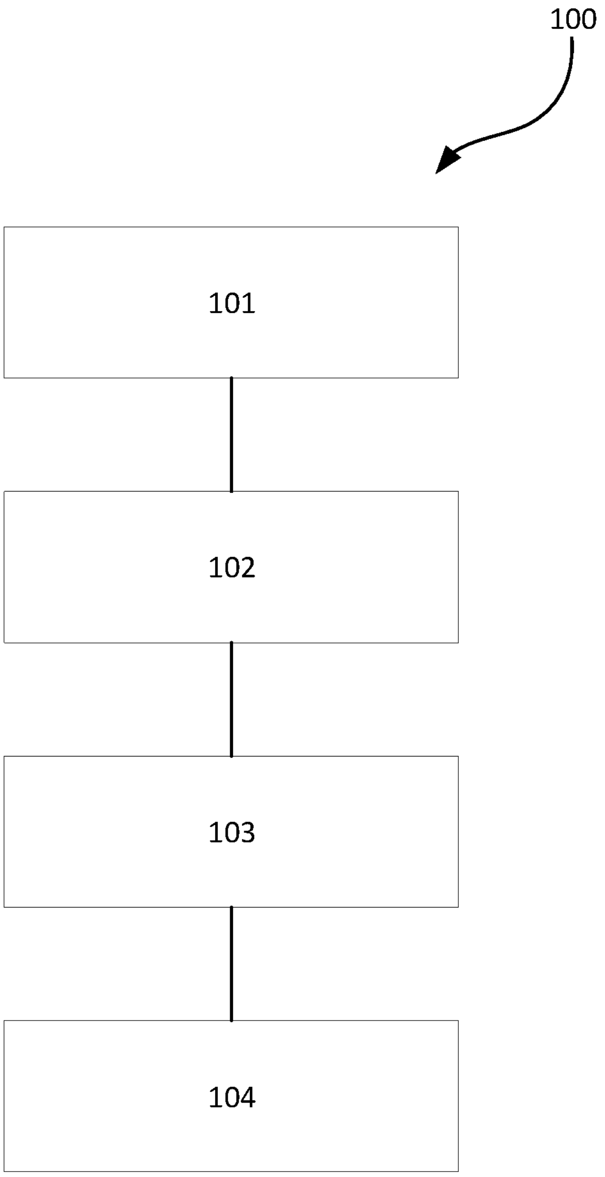
FIG. 6 illustrates a method for manufacturing an antenna arrangement in accordance with an embodiment of the present disclosure.

FIG. 6 illustrates a method 100 for manufacturing an antenna arrangement comprising the steps of providing 101 a sheet of dielectric having a connecting surface, the connecting surface comprising at least one grounding pad and a through-hole via extending from the at least one grounding pad into the connecting surface. Further providing an antenna element structure, the antenna element structure comprising at least one radiating section and at least one conical receiving section extending to the radiating section in a tapering manner. Further providing a conductive element and a dielectric element, wherein the conductive element comprises a first portion having a first diameter, the first portion extending towards a second portion having a second diameter, the second diameter being greater than the first diameter.

The method 100 further comprising the steps of forming 102 a launch pin by sleeving the dielectric element onto the conductive element, wherein a lower part of the conductive element protrudes from an end portion of the dielectric element. Moreover, the method comprises the step of inserting 103 the lower part of the conductive element into the through-hole via. Furthermore the method comprises the step of mounting 104 the antenna element structure to the sheet of dielectric so that the launch pin extend into the radiating section through the conical receiving section.

Further, the lower part of the conductive element may inserted into the through-hole via by means of press-fit.

A benefit of the method 100 is that it is convenient and rapid to manufacture. Further, by having a conical receiving section (shown explicitly in FIGS. 1-3) the antenna element structure 6 may swiftly be attached to the sheet of dielectric. Accordingly, the protruding rim allows for electrical contact with the grounding pad to be obtained easily. The elements of the antenna arrangement are in other words, designed to provide for a convenient manufacturing and assembly.

The invention claimed is:

1. An antenna arrangement comprising:
a sheet of dielectric having a connecting surface, the connecting surface comprising at least one grounding pad and a through-hole via;
an antenna element structure;
the antenna element structure comprising at least one radiating section and at least one receiving section extending towards the radiating section;
at least one antenna launch pin comprising a conductive element and a dielectric element;
wherein the conductive element comprises a first portion having a first diameter (D1), the first portion extending to a second portion having a second diameter (D2), the second diameter (D2) being greater than the first diameter (D1);
wherein the dielectric element contacts with and sleeves an upper part of the first portion of the conductive element, and wherein a lower part of the conductive element protrudes from an end portion of the dielectric element;
wherein the lower part of the conductive element is arranged so to extend through the through-hole via, allowing the launch pin to extend perpendicularly from said sheet of dielectric,
wherein the antenna element structure is attached to the sheet of dielectric, wherein the launch pin extends into the radiating section through the receiving section, wherein the dielectric element is circumferentially enclosed by at least a part of the receiving section.

2. The antenna arrangement according to claim 1, wherein the antenna element structure comprises a first surface facing the sheet of dielectric, the first surface comprising a protruding rim associated with the receiving section wherein said protruding rim is in electrical contact with said grounding pad.

3. The antenna arrangement according to claim 1, wherein the lower part of the launch pin is attached to the sheet of dielectric by means of soldering from a back surface of the sheet of dielectric, the back surface being on an opposite side of the sheet of dielectric relative to the connecting surface.

4. The antenna arrangement according to claim 1, wherein the dielectric element comprises a third diameter (D3), wherein the third diameter (D3) is 2-3 times greater than the first diameter (D1), so to obtain a 50 ohm impedance.

5. The antenna arrangement according to claim 1, wherein the antenna elements structure is a slot antenna element structure, notch antenna element structure or a patch antenna element structure.

6. The antenna arrangement according to claim 1, wherein the lower part of the conductive element forms an interference relative the through-hole, so to allow press-fit mounting of the launch pin into the through-bole-via.

7. The antenna arrangement according to claim 1, wherein the receiving section is a conical receiving section extending towards the radiating section in a tapering manner.

8. The antenna arrangement according to claim 1, wherein the dielectric element is circumferentially enclosed by at least a part of the receiving section.

9. A method for manufacturing an antenna arrangement comprising:
providing:
a sheet of dielectric having a connecting surface, the connecting surface comprising at least one grounding pad and a through-hole extending from the at least one grounding pad into the connecting surface;
an antenna element structure, the antenna element structure comprising at least one radiating section and at least one conical receiving section extending to the radiating section in a tapering manner;
a conductive element and a dielectric element,
wherein the conductive element comprises a first portion having a first diameter (D1), the first portion extending towards a second portion having a second diameter (D2), the second diameter (D2) being greater than the first diameter (D1),
the method further comprising:
forming a launch pin by contacting and sleeving the dielectric element onto the conductive element, wherein a lower part of the conductive element protrudes from an end portion of the dielectric element;
inserting the lower part of the conductive element into the through-hole; and
mounting the antenna element structure to the sheet of dielectric so that the launch pin extend into the radiating section through the conical receiving section, wherein the dielectric element is circumferentially enclosed by at least a part of the receiving section.

10. The method according to claim 9, wherein the lower part of the conductive element is inserted into the through-hole by means of press-fit.

11. A launch pin for an antenna structure comprising:
a conductive element; and
a dielectric element;

wherein the conductive element comprises a first portion having a first diameter (D1), extending to a second portion having a second diameter (D2), the second diameter (D2) being greater than the first diameter (D1), wherein the dielectric element comprises a hollow form having a third diameter (D3), wherein the third diameter (D3) is equal to or smaller than the second diameter (D2), wherein the dielectric element contacts with and sleeves at least an upper part of the first portion of the conductive element, wherein a lower part of the conductive element protrudes from an end portion of the dielectric element, wherein the lower part of the conductive element is arranged to be received by a through-hole in a sheet of dielectric, wherein the dielectric element is circumferentially enclosed by at least a part of the receiving section.

12. The launch pin according to claim 11, wherein the dielectric element comprises a third diameter, wherein the third diameter (D3) is 2-3 times greater than the first diameter (D1), so to obtain a 50 ohm impedance.

* * * * *